United States Patent
Sugiyama et al.

[11] 3,918,704
[45] Nov. 11, 1975

[54] STORAGE CONTROLLING APPARATUS FOR A SHEET-LIKE MATERIAL SORTING SYSTEM

[75] Inventors: Satoshi Sugiyama, Kanagawa; Yoshio Ariga, Yokohama, both of Japan

[73] Assignee: Tokyo Shibaura Electric Co., Ltd., Japan

[22] Filed: Apr. 17, 1974

[21] Appl. No.: 461,648

[30] Foreign Application Priority Data
Apr. 27, 1973    Japan.............................. 48-49726

[52] U.S. Cl. .................. 271/201; 271/263; 271/215
[51] Int. Cl.² .......................................... B65H 31/06
[58] Field of Search ............ 271/3.1, 200, 201, 214, 271/215, 258, 263; 214/7

[56] References Cited
UNITED STATES PATENTS

| | | |
|---|---|---|
| 2,861,805 | 11/1958 | Auer ...................... 271/215 |
| 3,033,564 | 5/1962 | Carroll et al. ............ 271/215 |
| 3,591,170 | 7/1971 | Doughty et al. .......... 271/263 |
| 3,682,473 | 8/1972 | Kuyt ...................... 214/7 |
| 3,683,758 | 8/1972 | Feldkamper .............. 271/3.1 |
| 3,731,916 | 5/1973 | Pettet ..................... 271/263 |
| 3,826,487 | 7/1974 | Forster et al. ............ 271/263 |

FOREIGN PATENTS OR APPLICATIONS
6,618,060    6/1967    Netherlands........................ 214/7

Primary Examiner—Evon C. Blunk
Assistant Examiner—Robert Saifer
Attorney, Agent, or Firm—Oblon, Fisher, Spivak, McClelland & Maier

[57]  ABSTRACT

A storage controlling apparatus for a sheet-like material sorting system includes a conveyor belt means for conveying the sheet-like materials and a movable head which supports the conveyor belt thereon near a terminal portion. The movable head is movable in such a direction as to intersect the direction of the conveying path of the sheet-like materials. Further, a storer adapted to receive the sheet-like materials conveyed by the conveyor belt and a means for detecting the existence of the sheet-like materials while being conveyed toward the storer are provided. The movement of the movable head is controlled by a signal from the means for detecting the existence of the sheet-like materials thereby enabling an optimum storage condition for the sheet-like materials stored in the storer.

7 Claims, 18 Drawing Figures

STORAGE CONTROLLING APPARATUS FOR A SHEET-LIKE MATERIAL SORTING SYSTEM

BACKGROUND OF THE INVENTION

1. Field of the Invention

The present invention relates in general to a storage controlling apparatus for sheet-like materials and more particularly to successively controlling a storage condition of the sheet-like materials such as letters, post cards or the like which are conveyed in an upright position to a storer.

2. Description of the Prior Art

In a processing system for sheet-like materials such as post cards, letters or the like, the processing speed of the sheet-like materials that is, the processing ability per unit time is usually set up to be constant.

On the other hand, the quantity of sheet-like materials supplied per unit time is not constant.

Therefore, in such processing systems, a storer is provided to temporarily store the sheet-like materials. More specifically, such processing systems include a conveyor belt for conveying the sheet-like materials from a sending station to the storer, and a movable head which holds an end portion of the conveyor belt thereon and is movable in a direction substantially perpendicular to the conveying direction of the sheet-like materials. Such processing systems further include a storer which temporarily stores the sheet-like materials conveyed by the conveyor belt in an upright position, and a suction device to remove the stored sheet-like materials, one at a time. The suction device is operated by a vacuum pump. A conveyor belt is provided to transport the sheet-like materials to a receiving station. In the case where sheet-like materials are not stored in the storer, the movable head will locate adjacent to the suction device and if the quantity of the sheet-like materials carried in from the sending station exceeds the quantity taken out by the suction device, then the movable head has to be shifted in a direction away from the suction device. On the other hand, if the quantity of sheet-like materials taken out from the storer exceeds the quantity carried in, then the movable head has to be shifted in a direction towards the suction device. Thus, the movement of the movable head has to be done quickly and in compliance with the quantity of sheet-like materials conveyed to the storer. If the movement of the movable head is improper, then the sheet-like materials may be stored excessively or insufficiently in the storer which will cause interference with a smooth taking out from the storer.

In order to improve this defect, it was proposed to provide a pressure detecting device adjacent to the storer. The pressure detecting device was to detect the pressure of the sheet-like materials stored in the storer irrespective of the thickness of the sheet-like materials. If the pressure exceeded a a predetermined value, the movable head would be moved in a direction away from the storer, and on the contrary, if the pressure became lower than the predetermined value, the movable head would be moved in a direction towards the storer. Nevertheless, even with such a pressure detecting device, the storing condition of the sheet-like materials in the storer lacked uniformity. This was especially the case when both thin and thick sheet-like materials were supplied, since it was difficult to adjust the pressure detecting device at an optimum storing condition and accordingly the movement of the movable head based on an output signal of the pressure detecting device usually had a time delay, such that the storing condition in the storer became excessive and would cause clogging of the sheet-like materials in the storer.

SUMMARY OF THE INVENTION

Accordingly, it is one object of the present invention to provide a new and improved unique storage controlling apparatus for sheet-like materials which is capable of attaining optimum storage condition of the sheet-like materials in the storer.

Still another object of the present invention is to provide a new and improved unique storage controlling apparatus for sheet-like materials which does not suffer from undesirable clogging of the sheet-like materials in the storer and which is capable of smooth taking out from the storer irrespective of the thickness of the sheet-like materials.

A still further object of the present invention is to provide a new and improved unique storage controlling apparatus for sheet-like materials which does not damage the end portion of the sheet-like materials when they are stored in the storer.

Briefly, in accordance with this invention, the foregoing and other objects are in one aspect attained by a conveyor belt for conveying the sheet-like materials, a movable head with supports a terminal portion of the conveyor belt is movable in a direction such as to intersect the direction of the conveying path of the sheet-like materials, a storer adapted to receive said sheet-like materials conveyed by said conveyor belt means and a means for detecting the existence or presence of the sheet-like materials while being conveyed toward said storer thereby controlling the movement of said movable head in compliance with an output signal from said means for detecting the existence or presence of the sheet-like materials.

BRIEF DESCRIPTION OF THE DRAWINGS

Other objects and features of the invention will be better understood by reference to the following detailed description when considered in connection with the accompanying drawings, wherein.

DETAILED DESCRIPTION OF THE PREFERRED EMBODIMENTS

Figure 1:
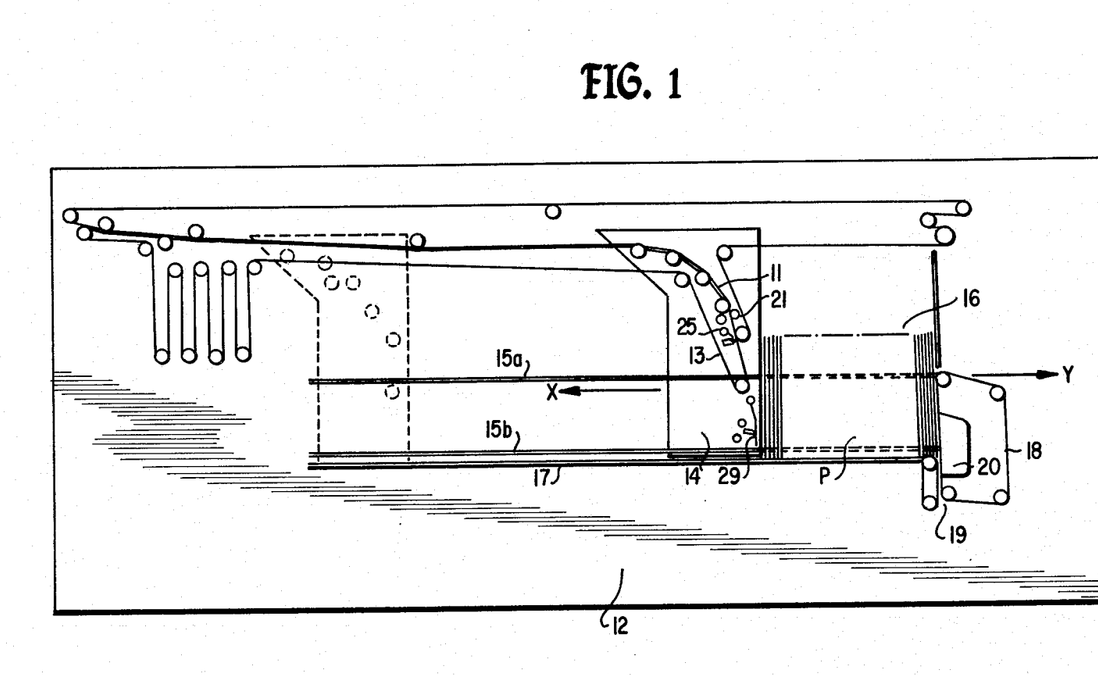
FIG. 1 is a diagramatic illustration according to one preferred embodiment of the present invention.
Figure 2:
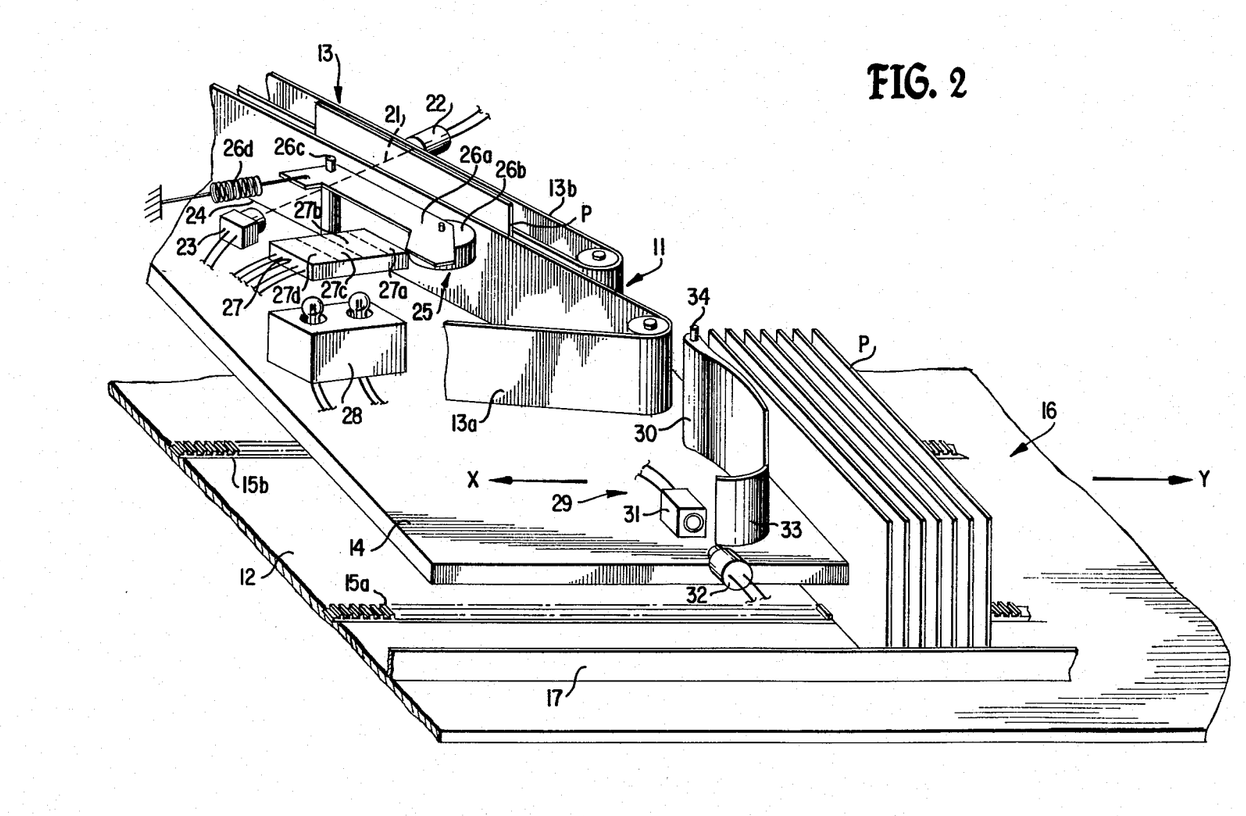
FIG. 2 is a perspective view of the storage controlling apparatus as represented in FIG. 1.
Figure 3:
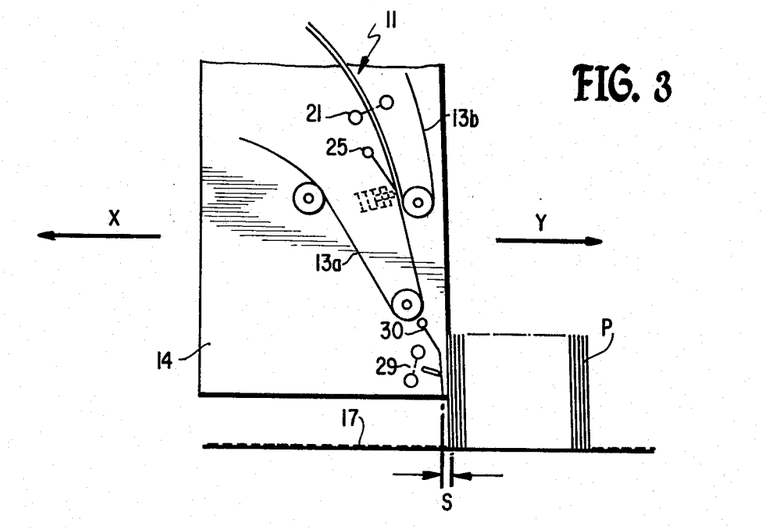
FIG. 3 is a diagramatic plane view of the apparatus of FIG. 2.

Referring now to the drawings, wherein like reference numerals indicate identical or corresponding parts throughout the several views and more particularly to FIG. 1 through FIG. 3 thereof, wherein a storage controlling apparatus for sheet-like materials according to the present invention is shown. A conveyor belt means 11 is mounted on a base plate 12, and comprises a pair of conveyor belts 13a and 13b which are arranged so as to carry or transport sheet-like materials P such as post cards, letters or the like in an upright position or on an edge by clamping the sheet-like materials P between the two belts 13a and 13b which have opposed faces which run parallel to each other. A movable head 14 is provided under or beneath the conveyor belt means 11 near an end or terminal portion of the conveyor belt means 11. More specifically, the end of terminal portion of the conveyor belt means 11 is mounted on the movable head 14 and the same serves to hold the sheet-like materials P in an upright position by allowing a surface of the sheet-like materials P to have directional movement on the moveable head 14. The movable head 14 having the terminal of the conveyor belts 13a and 13b on it is movable in such a direction as to intersect the direction of the conveying path of the sheet-like materials P, for example, the direction as indicated by the arrows X and Y. Endless belts 15a and 15b are provided under or beneath the movable head 14 and support the edge of the sheet-like materials P which are ejected from the conveyor belt means 11 in an upright position. The endless belt 15a and 15b form a bottom part of a storer 16 and are positioned substantially parallel to each other. A side part of the storer 16 is formed by a side belt 17 which is arranged substantially parallel to the endless belt 15a or 15b. The side belt 17 supports the edge of the sheet-like materials ejected from the conveyor belts 13a and 13b. A suction device 18 is arranged adjacent to the storer 16 to take out the sheet-like materials P, one at a time, and comprises an endless belt 19 having a plurality of perforations throughout its length to allow the application of a vacuum through the belt by means of a vacuum source 20 placed within the belt loop. A presence or existence detecting means for sheet-like materials is provided along the travelling path of the sheet-like materials. The presence detecting means may consist of a passage detecting means 21 and/or a thickness detecting means 25. In this embodiment, the passage detecting means 21 and the thickness detecting means 25 are used as the presence detecting means. The passage detecting means 21 is arranged along the conveying path of the sheet-like materials P which is formed by the conveyor belts 13a and 13b and serves to detect the passage of the end portion or front portion of the sheet-like materials. As best shown in FIG. 2, the passage detecting meeans 21 consists of, for example, a light emitting device, such as a lamp 22, and a photoelectric detecting device 23, such as a photo-transistor, or a photo-diode. The lamp 22 and the photoelectric detecting device 23 are arranged at an outside and lower portion of the conveyor belt 13a and 13b so as to enable the light from the lamp 22 to pass through a gap 24 between the conveyor belt 13a and 13b and the movable head 14 for entry into the photoelectric detecting device 23.

The thickness detecting means 25 may consist of a detecting lever 26, a light emitting device, for example, a lamp device 28 and a photoelectric detecting device 27, which is provided at an inner loop formed by the conveyor belt 13a, to detect the thickness of the sheet-like materials P. The detecting lever 26 includes a substantially U-shaped supporting arm 26a which is turnable about the center of a shaft 26c and a contactor, for example, a roller 26b which is supported at one end of the supporting arm 26a. The other end of the supporting 26a is provided with a spring 26d which is extended in such a manner that the roller 26b will usually make contact with the conveyor belt 13a. The photoelectric detecting means 27 may consist of several solar cells 27a, 27b, 27c, and 27d which are adjacent to each other and in juxtapose relationship. The lamp device 28 and the photoelectric detecting device 27 are arranged spaced apart and opposite to each other such that light from the lamp 28 is interrupted, step by step, by the movement of the supporting arm 26b in accordance with the thickness of the sheet-like materials P. The movable head 14 therefore may be retreated a predetermined distance in the direction shown by the arrow X to provide space in the storer 16 in accordance with the output signal from the passage detecting means 21 and the thickness detecting means 25.

Further, according to this embodiment, a pressure detecting means 29 is mounted on the movable head 14 and is positioned adjacent to the storer 16 to detect the pressure of the sheet-like materials P stored in the storer 16. The pressure detecting means 29 may consist of a guide or lever 30 which guides the sheet-like materials laterally to the storer 16, a photoelectric detecting device 31 and a light emitting device such as a lamp 32. The lever 30 has a curved portion 33 at one end portion thereof and the other end is supported by a shaft 34. If a pressure beyond a predetermined value is applied to the lever 30 then the curved portion 33 of the lever 30 will interrupt the light from the lamp 32 to the photoelectric detecting device 31.

Figure 4:
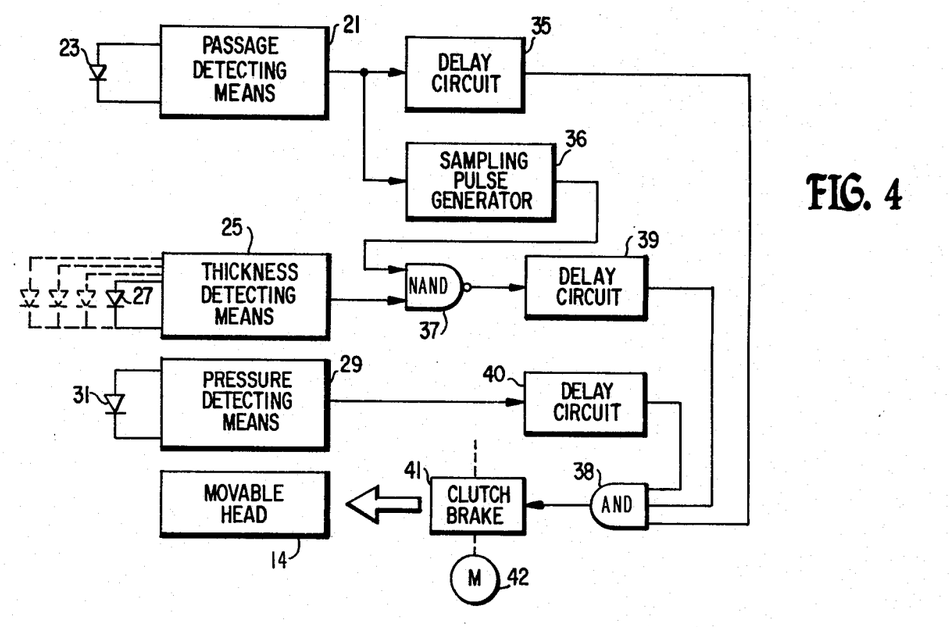
FIG. 4 is a block diagram showing the controlling circuitry of the storage controlling apparatus illustrated in FIG. 2.

FIG. 4 shows a block diagram of a controlling apparatus according to the preferred embodiment of the present invention shown in FIGS. 1 to 3. An output signal from the passage detecting means 21 is applied to an AND circuit 38, a delay circuit 35, which delays the signal in order to adjust the movement of the movable head 14, and to a sampling pulse generator 36. The sampling pulse generator 36 starts to generate pulses having a predetermined interval when the passage detecting means 21 detects the front portion of the flow of the sheet-like materials P and continues to generate pulses until the flow of the sheet-like materials is stopped. An output signal from the thickness detecting means 25, more specifically an output from the solar cells 27c and 27d, for example, is applied to a NAND circuit 37. The output signal from the sampling pulse generator 36 is also applied to the NAND circuit 37. A signal from the NAND circuit 37 is then applied to the AND circuit 38 through a delay circuit 39, which delays the signal to adjust the movement of the movable head 14. An output signal from the pressure detecting means 29 is also applied to the input of the AND circuit 38 through a delay circuit 40. Therefore, if the output signal of the AND circuit 38 is 1, a signal will be transmitted to a clutch brack 41 to excite a motor 42 and the movable head 14 will thereby be caused to move in a direction such as to ease the entrance of the sheet-like materials to the storer 16. It will be easily understood that the AND circuit 38 may be replaced by an OR circuit.

Figure 5A:
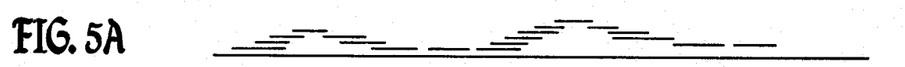
FIGS. 5A to 5I, respectively, show output waveforms at some portion of the storage controlling apparatus shown in FIG. 4.
Figure 5B:
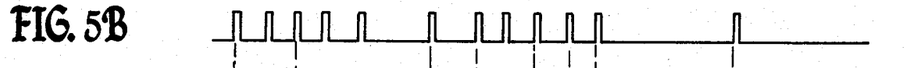
Figure 5C:
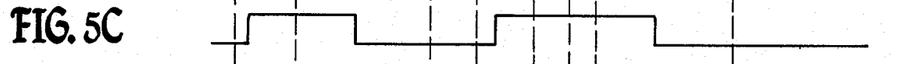
Figure 5D:
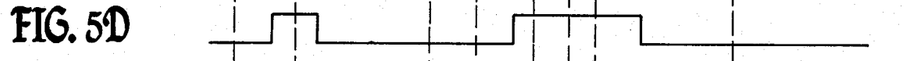
Figure 5E:
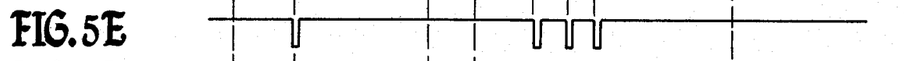
Figure 5F:
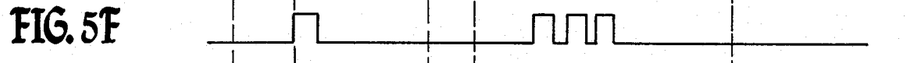
Figure 5G:
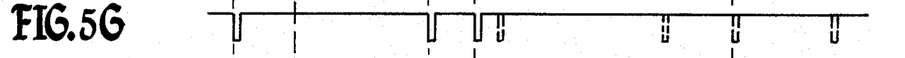
Figure 5H:
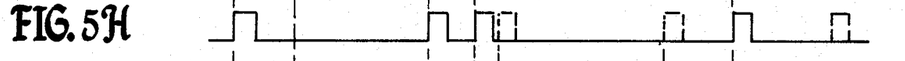
Figure 5I:
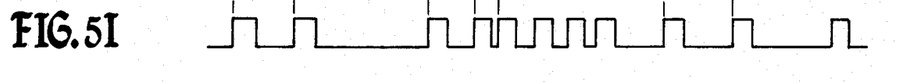
Figure 6:
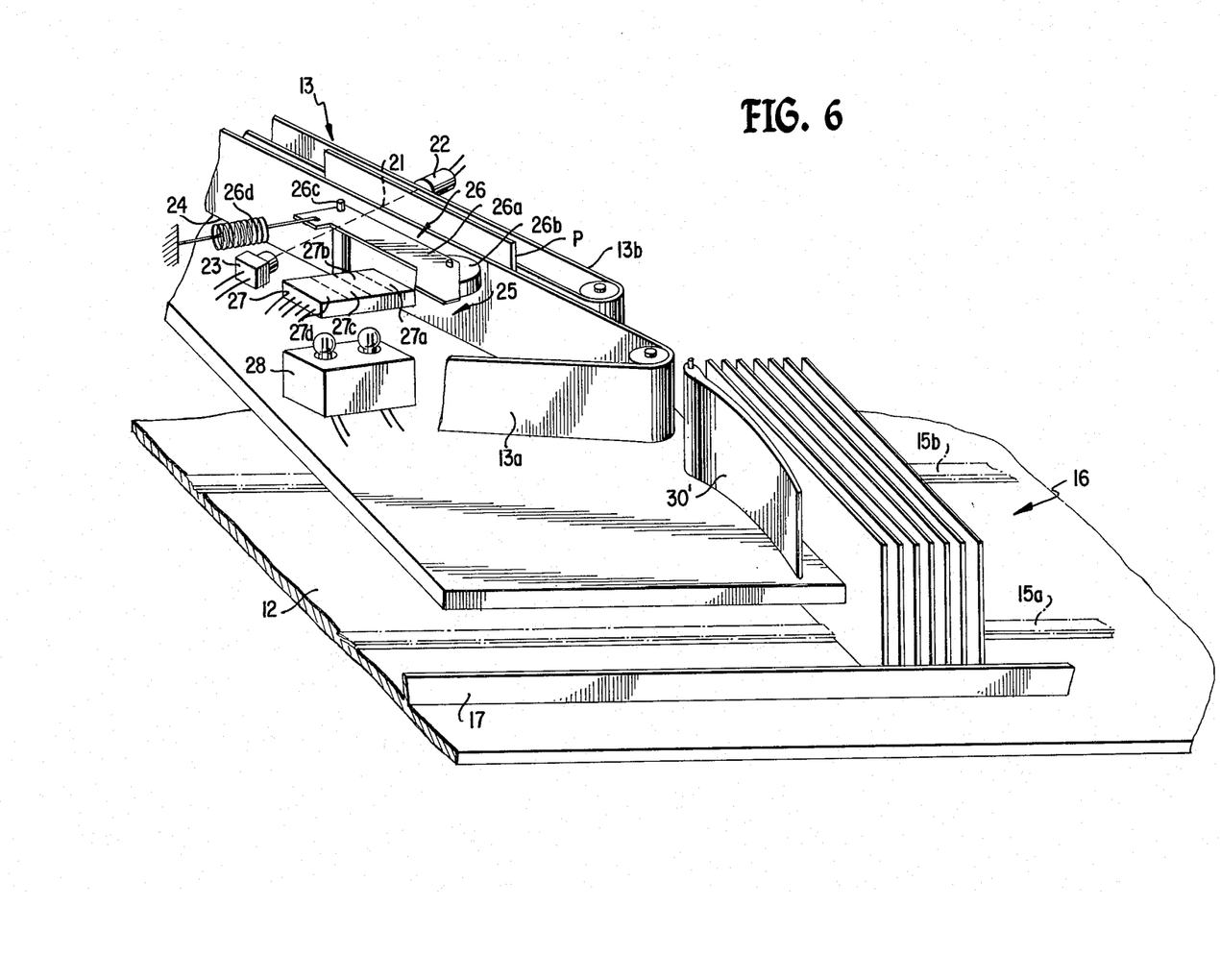
FIG. 6 is a perspective view of the storage controlling apparatus according to another preferred embodiment of the present invention.

FIGS. 5A through 5I show output waveforms at certain portions of the storage controlling apparatus shown in FIG. 4. FIG. 5A shows the phase of the flow of the sheet-like materials P delivered by the conveyor belt means 11. FIG. 5B shows the output signal waveform of the sampling pulse generator 36. FIGS. 5C and 5D show the output waveform of the solar cells 27 of the thickness detecting means 25, in the case where two of the four solar cells 27, that is, solar cells 27c and 27d are successively operated. FIGS. 5E and 5F show the waveform of the output signal of the NAND circuit 37 and delay circuit 39, respectively. FIG. 5G shows the detection waveform of the passage detecting means 21 for the case where the front portion of the sheet-like materials P is detected. In FIG. 5G, the dotted waveform shows the output waveform of the pressure detecting means 29. FIG. 5H shows the output waveform of the delay circuit 35. The output waveform of the delay circuit 40 is shown in FIG. 5H as a dotted line waveform. FIG. 5I shows the output waveform of the NAND 38, that is, the combined waveform of the one shown in FIGS. 5F, 5H and 5G with the dotted line. The output waveform shown in FIG. 5I is applied to the clutch brake 41 to excite the motor 42 to thereby move the movable head 14 in the direction X or Y.

Now, a particular operation of the present invention will be explained with reference to FIG. 1 through FIG. 5I.

When the sheet-like materials P are brought to the conveyor belt means 11 from the sending station (not shown), the sheet-like materials P are then conveyed by the conveyor belts 13a and 13b to the passage detecting means 21. If the passage detecting means 21 detects the front end or rear end of the sheet-like materials, the output signals therefrom are applied to the AND circuit 38 through the delay circuit 35. After passing through the passage detecting means, the sheet-like materials P will reach the thickness detecting means 25 whereby the thickness of the sheet-like materials are detected. That is, the roller 26b which usually makes contact with the conveyor belt 13a will display its original position by an amount equivalent to the thickness of the sheet-like materials. The displacement of the roller is transmitted to the supporting arm 26a of the detecting lever 26 and thereby rotates the lever 26 to the direction shown by the arrow. The end portion of the supporting arm 26a will intervene in the gap between the lamp 28 and photoelectric detecting device 27 and thereby interrupt the light from the lamp 28. The amount of the displacement of the supporting arm 26a is then detected step by step by each of the solar cells 27a, 27b. . . . The movable head 14 is adjusted in accordance with the amount of displacement detected. For example, if the detecting lever 26 interrupts one of the solar cells 27, then the movable head is retreated a distance S in the direction shown by the arrow X. If the detecting lever 26 interrupts two of the solar cells 27, then the movable head is retreated a distance 2S by the motor 42. The output signal from the solar cells 27a, 27b . . . is applied to the input terminal of the AND circuit 38 through the delay circuit 35. Further, if the pressure of the sheet-like materials P in the storer 16 exceeds a predetermined value, the pressure will be detected by the pressure detecting means 29 and the output signal therefrom will be applied to the input of the AND circuit 38 through the delay circuit 40 so as to adjust and retain the storage pressure in an optimum condition.

Accordingly, before the sheet-like materials P are fed into the storer 16, the presence of enough space for succeeding sheet-like materials P is determined by the movement of the movable head 14 as controlled by the passage detecting means 21 and the thickness detecting means 25 to thereby enable a smooth carrying in of the sheet-like materials to the storer. Further, the pressure of the sheet-like materials P stored in the storer 16 is detected by the pressure detecting means 29 which adjusts or corrects the storage condition in the storer 16 to a suitable pressure value. Thus, it is possible to eliminate any clogging of the sheet-like materails in the storer 16, especially, at the outlet of the storer 16 which is adjacent to the suction device 18 for taking out the sheet-like materials P.

Figure 7:
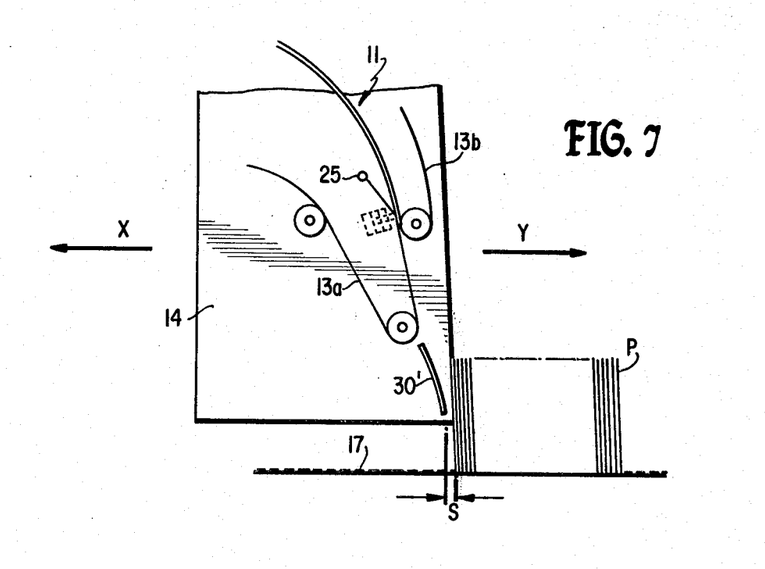
FIG. 7 through FIG. 10 are diagramatic plane views of the storage controlling apparatus according to still further preferred and alternative embodiments of the present invention, respectively.
Figure 8:
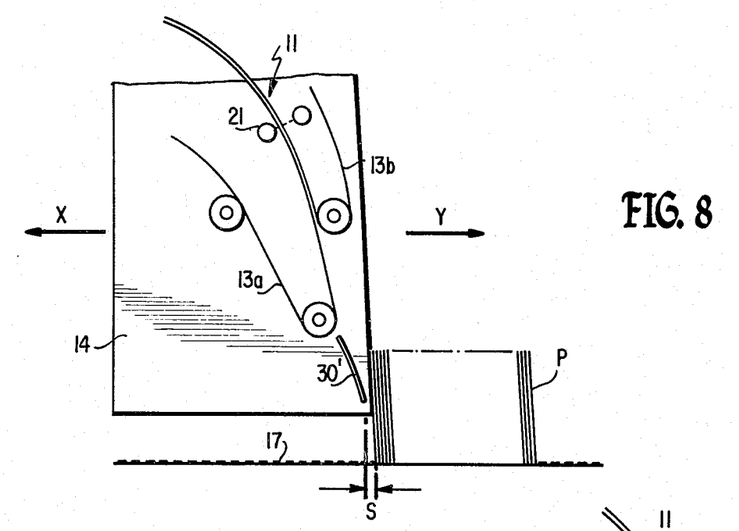
Figures 9, 10:
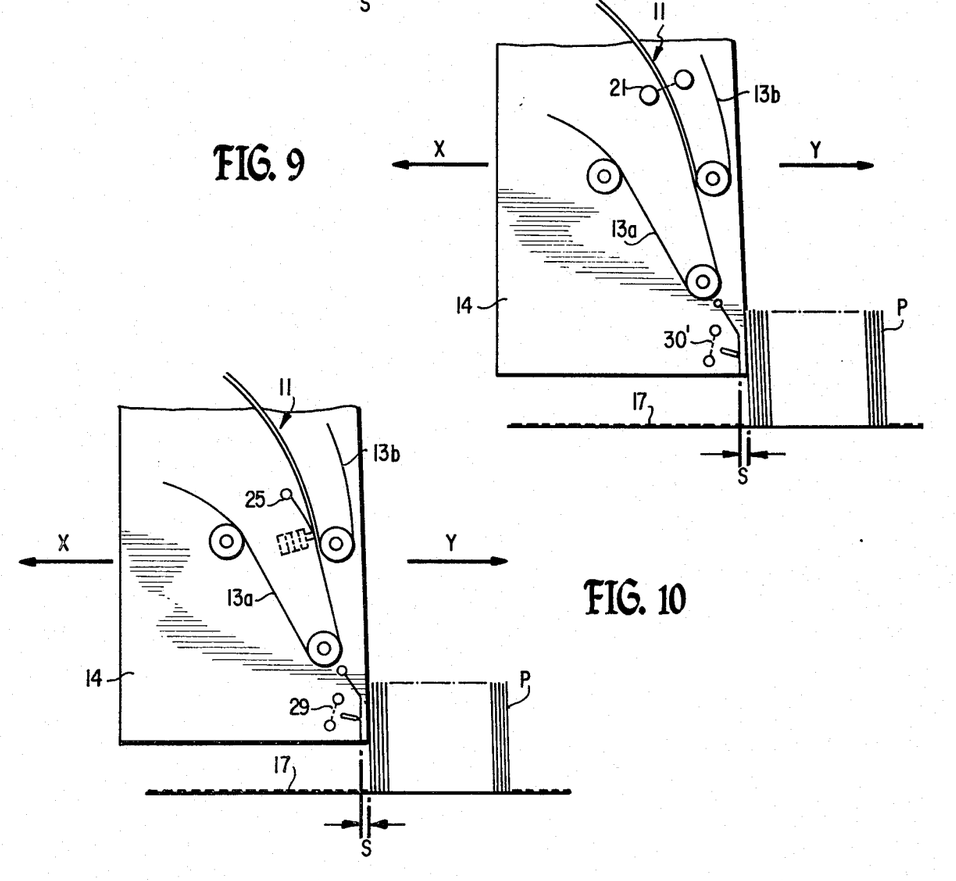

Though, in the embodiment shown in FIG. 1 to FIG. 3, the passage detecting means 21 and the thickness detecting means 25 are provided as the presence detecting means, it should be understood that the present invention can be attained if either the passage detecting means 21 or thickness detecting means 25 is provided. Thus instead of the above embodiment, either the passage detecting means 21, or the thickness detecting means 25 can be eliminated and also the pressure detecting means 29 can be eliminated as shown in FIGS. 6 to 10. For example, in FIG. 6, the passage detecting means 21 and the thickness detecting means 25 are provided the same as in the apparatus shown in FIG. 2. However, the pressure detecting means 29 is eliminated and is replaced by a guide 30' which is fixed near the edge of the movable head 14. In FIG. 7, the passage detecting means 21 and the pressure detecting means 29 are eliminated. In FIG. 8, the thickness detecting means 25 and the pressure detecting means 29 are eliminated. In FIG. 9, the thickness detecting means 25 and the pressure detecting means 29 are eliminated and in FIG. 10, the passage detecting means 21 is eliminated.

Further, in the above embodiment, the passage or the thickness of the sheet-like materials P are detected optically by the passage detecting means 21 or the thickness detecting means 25, that is, the lamps 22 or 28 and the photoelectric detecting device 23 or solar cells 27 are used as a detecting means. It should be understood that instead of optical devices, a mechanical device may be used. For example, a micro-switch may be used as the passage detecting means 21 or the thickness detecting means 25.

Moreover, in the above-embodiment, the thickness detecting means 25 is arranged inside the conveyor belt 13a and the thickness of the sheet-like materials P are transmitted to the roller 26b through the conveyor belt 13a. However, instead of this arrangement, the thickness detecting means 25 may be arranged outside of the conveyor belt means 11, for example, outside of the conveyor belt 13a so that the sheet-like materials pass between the conveyor belt and the roller 26b of the thickness detecting means 25 such that the thickness of the sheet-like materials is transmitted directly to the thickness detecting means 25.

As described above, according to the present invention, optimum storage condition of the sheet-like materials in the storer before they are conveyed into the storer is attained by the presence detecting means. Thus, smooth entrance of successive sheet-like materials into the storer without damage to the end portion thereof is enabled. Also, it is possible with the present invention to eliminate clogging of the sheet-like materials in the storer, especially, at the outlet thereof adjacent to the suction device, which enables smooth withdrawal of the sheet-like materials by the suction device. Further, if the pressure detecting means is provided, an optimum storage condition of the sheet like material in the storer will be attained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A storage controlling apparatus for sheet-like materials comprising:
    conveyor belt means for conveying sheet-like materials,
    a movable head for supporting a terminal portion of the conveyor belt means,
    means for moving the movable head in a direction to intersect the direction of the conveying path of the sheet-like materials,
    a storer disposed adjacent to the movable head and adapted to receive the sheet-like materials conveyed by the conveyor belt means,
    means for detecting the thickness of each sheet-like material as it is conveyed toward the storer; and
    means connecting the movable head moving means and the thickness detecting means for moving the movable head a distance corresponding to the thickness detected of each sheet-like material.

2. A storage controlling apparatus for sheet-like materials according to claim 1 further comprising photoelectric means for detecting the passage of each sheet-like material and means connecting the photoelectric means to the means for moving the movable head for moving the movable head in accordance with detection of the passage of each sheet-like material.

3. A storage controlling apparatus for sheet-like materials according to claim 1 further comprising means for detecting the pressure of the sheet-like materials stored in said storer, said pressure detecting means being mounted on the movable head adjacent to the storer, means connecting the pressure detecting means to the means for moving the movable head for moving the movable head in accordance with the pressure of the sheet-like materials stored in the storer.

4. A storage controlling apparatus for sheet-like materials comprising:
    a conveyor belt means for conveying sheet-like materials on an edge thereof,
    a movable head for supporting a terminal portion of the conveyor belt means,
    means for moving the movable head in a direction to intersect the direction of the conveying path of the sheet-like materials,
    a storer disposed adjacent to the movable head and adapted to receive the sheet-like materials conveyed by the conveyor belt means,
    means for detecting the passage of each sheet-like material comprising a light emitting device and a photoelectric detecting device arranged in opposite relation to each other and interposing the conveyor belt means therebetween so that light from the light emitting device is prevented from reaching the photoelectric device when each sheet-like material passes therebetween, and
    means for detecting the thickness of each sheet-like material comprising a supporting arm turnable about the center of a shaft mounted on the movable head, a contactor supported at one end of the supporting arm to make contact with the sheet-like materials, a light emitting device and a photoelectric detecting device arranged in opposite relation to each other and spaced apart so that light from the light emitting device is interrupted by an end portion of the supporting arm due to a movement thereof corresponding to the thickness of each sheet-like material,
    means connecting the movable head moving means, the passage detecting means and the thickness detecting means for moving the movable head a distance corresponding to the thickness detected to each sheet-like material.

5. A storage controlling apparatus for sheet-like materials according to claim 4 wherein the photoelectric detecting device of the means for detecting the thickness of each sheet-like material is a solar cell device comprising a plurality of solar cells arranged adjacent to each other and in juxtaposed relationship.

6. A storage controlling apparatus for sheet-like materials according to claim 4 comprising means for detecting the pressure of the sheet-like materials stored in the storer comprising a lever disposed on the movable head adjacent to the storer, the lever being turnable about a shaft which supports one end thereof, a light emitting device and a photoelectric detecting device disposed in opposite relation to each other and spaced apart so that the light from the light emitting device is interrupted by the other end part of the lever when the lever detects a pressure beyond a predetermined pressure, means connecting the movable head moving means and the pressure detecting means for moving the movable head a distance in accordance with the pressure of the sheet-like materials stored in the storer.

7. A storage controlling apparatus for sheet-like materials according to claim 4 further comprising a guide mounted on the movable head adjacent to the storer to guide each sheet-like material to the sorter after conveyance by the conveyor belt means.

* * * * *